July 9, 1957  R. E. FLETCHER ET AL  2,798,382
POWER TAKE-OFF CONTROL MECHANISM
Filed April 4, 1955  2 Sheets-Sheet 1

INVENTORS
ROBERT E. FLETCHER &
G. RAYMOND REED
BY
Lawrence C. Whitker
ATTY.

July 9, 1957 R. E. FLETCHER ET AL 2,798,382
POWER TAKE-OFF CONTROL MECHANISM
Filed April 4, 1955 2 Sheets-Sheet 2

INVENTORS
ROBERT E. FLETCHER &
G. RAYMOND REED
BY Lawrence C. Wicker
ATTY.

2,798,382
POWER TAKE-OFF CONTROL MECHANISM

Robert E. Fletcher and G. Raymond Reed, Toledo, Ohio, assignors to Dana Corporation, Toledo, Ohio, a corporation of Virginia Application April 4, 1955, Serial No. 499,004

3 Claims. (Cl. 74—473)

This invention relates to power take-off devices for connection with a main driving source. Particularly such power take-off devices as are employed for attachment to motor vehicles, such as trucks or tractors, and are capable of being connected with the transmission thereof so as to provide a readily available power source.

The present invention is concerned with a power take-off having two output shafts and with the controls of such a device. Said controls being capable of connecting the output shafts with the drive gear alternately or maintaining both shafts in a neutral position at the same time. All operations are controlled by a single exterior control lever that is connected to a novel linkage method within the power take-off making it possible to engage either shaft without the engaging means on the other moving. It will also be noted that each output shaft has its own locking means to keep it in, or out of, gear.

The following description will present other advantages and reference will be made to the drawings in which.

Figure 1:
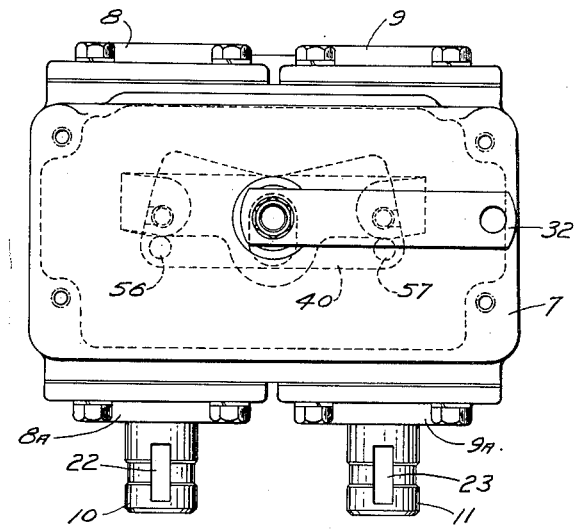
Fig. 1 is a plan view of the power take-off of this invention showing the controls in a neutral position.

As shown in the drawing a power take-off device is provided which comprises a hollow casing 7 having on opposite sides thereof opposed bosses 8, 8a and 9, 9a for the rotatable mounting therein, by suitable bearings, of a pair of parallel and spaced shafts 10, 11 each shaft having a splined portion 12, 13 upon which is mounted a spur gear 14, 15 axially slideable along the splined portion of its respective shaft.

Also mounted within the casing 7 in parallel relationship to the shafts 10, 11 is a non-rotary shaft 16 upon which is mounted a rotatable double gear 17, one gear 18 of the double gear 17 is in constant mesh with the source of power and the other gear 19 is in position to have meshing engagement with the spur gears 14, 15. When the controls are in neutral, neither spur gear 14, 15 is in contact with the double gear 17 and the latter is then merely an idler gear.

It will be simpler if the description of one output shaft 10 is presented with the understanding that both shafts 10, 11 are alike to the point of connection to outside pieces of equipment.

Shaft 10 is mounted at one end in a bearing 20 and terminates in a boss 8, the other end is mounted in a bearing 21 and extends through the boss 8a outside the casing 7. A seat 22 is formed to receive a shaft key for coupling of the shaft 10 to the equipment to be driven. A seal 24 held by a garter spring 25 prevents the egress of lubricant and the ingress of dirt and foreign matter.

A ball 28 and spring 29 in the shaft 10 form a poppet through which the operator can positively feel when the spur gear 14 in, or out of, mesh with the input gear 19 when the controls are operated for this purpose. The poppet construction is moved from the location shown 30 to the alternate position 31 when the shaft is projected from the rear of the casing 7 instead of the front as shown. When the gear 14 is in neutral the ball 28 locks in one pocket 61 and when engaged, in the other pocket 62.

The exterior control lever 32 is shown in all views either in, or operating from, the same neutral position. It will be understood that other positions of the lever 32 can be used. This would correspondingly change the sequence of operations to be described, but would not change the intent of the invention.

A boss 33 is provided on the casing 7 through which a rod 34 passes. The rod 34 is locked at one end to the exterior control lever 32 by a suitable means, such as a threaded portion 35 to receive a lock washer 36 and nut 37. A spacer 38 is provided between the boss 33 and the lever 32. The seal 39 prevents the egress of lubricant and the ingress of foreign matter between the rod 34 and the boss 33.

The exterior control lever 32 is connected by means of the rod 34 to an interior control plate 40. Another plate 41 held stationary with the casing 7 as with pin 42 is provided for pivot points 43, 44 to be described later. Interposed between control plate 40 and stationary plate 41 is a shift arm 45 to which shoes 46, 47 are connected at opposite ends 48, 49 by means of shoulder pins 50, 51 respectively. The shift arm 45 carries balls 52, 53 to be received in pivot points 43, 44 or recesses 54, 55 in plate 40 as the situation may dictate. The interior control plate 40 also carries two shift pins 56, 57.

The shoes 46, 47 ride in grooves 58, 59 in the spur gear 14, 15 respectively and are the means by which the controls shift the spur gears 14, 15 in, or out of, mesh with the input gear 19.

Shift arm 45 is slotted at 60 to give it free movement about rod 34.

Figure 2:
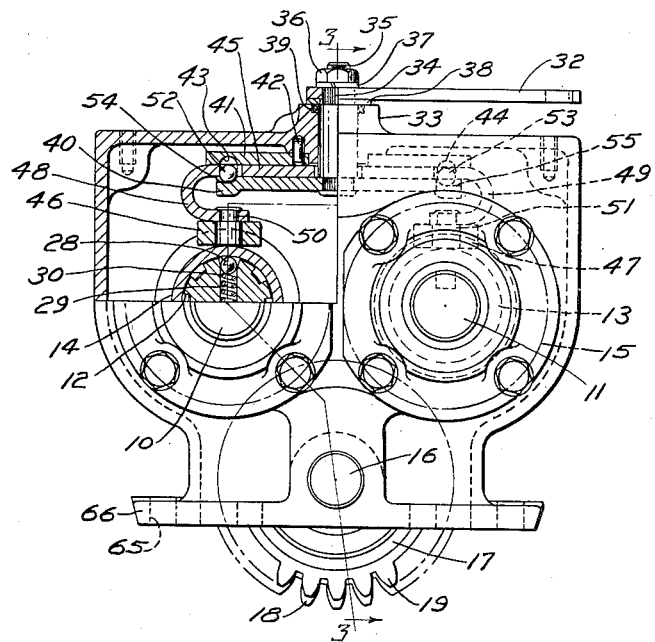
Fig. 2 is an end view of the power take-off of Fig. 1, partly in section, showing the controls in neutral.
Figure 3:
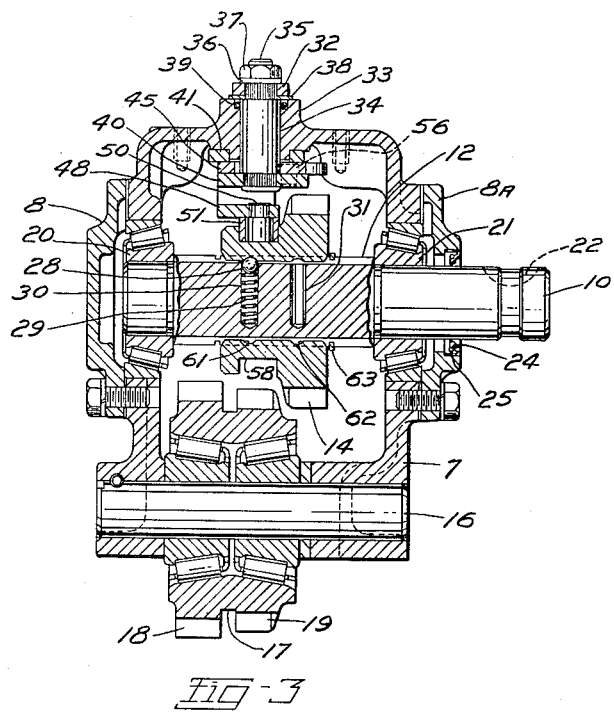
Fig. 3 is a side view of this invention, in section, taken substantially along the line 3—3 in Fig. 2 again showing the controls in neutral position.

When both output shafts 10, 11 are inoperative, or in neutral, the balls 52, 53 are in the position shown in Fig. 2 and the entire control unit is in the position best shown in Fig. 1.

Figure 4:
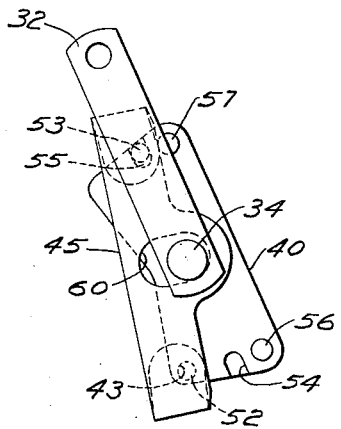
Fig. 4 is a plan view of the controls of this invention with the shaft to the right in Fig. 1 in operation.

Referring to Fig. 4 particularly. The right shaft 11 is operating and the left shaft 10 is in neutral. To accomplish this the lever 32 is moved toward the rear of the casing 7 causing plate 40 to turn. Ball 52 is forced into pivot point 43 locking shift arm 45 to plate 41 thus freeing plate 40 and establishing a fulcrum at this point, ball 53 stays in recess 55 locking shift arm 45 to plate 40. The pin 57 is moved against the shift arm 45 and causes it to pivot around the ball 52; the gear 15 moves into mesh with the gear 19. When disengaging the shaft 11, the ball 53 in the recess 55 serves as the locking means to move shift arm 45 with plate 40, thus moving the gear 15 out of mesh with gear 19.

Figure 5:
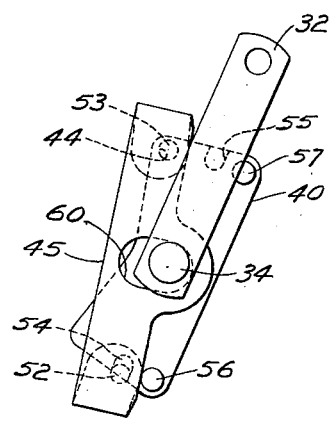
Fig. 5 is a plan view of the controls of this invention showing the shaft to the left in Fig. 1 in operation.

Referring to Fig. 5 particularly. The left shaft 10 is operating and the right shaft 11 is in neutral. This operation results from moving the lever 32 forward, control plate 40 turns forcing ball 53 up into pivot point 44 locking shift arm 45 to plate 41 thus freeing plate 40, creating a fulcrum at this point; ball 52 stays in recess 54 locking shift arm 45 to plate 40. Pin 56 moves shift arm 45 back, pivoting it around ball 53; consequently, spur gear 14 moves into mesh with gear 19. When disengaging shaft 10 the ball 52 in the recess 54 serves as the locking means to move shift arm 45 with plate 40, thus moving the gear 14 out of mesh with gear 19.

Snap rings 63, 64 are on the splines 12, 13 to prevent overshifting into neutral and as an aid to the fulcrum when shifting. These snap rings are in grooves at the other end of the splines when the shafts 10 and 11 are reversed.

A Bowden wire, or other suitable means, may be used to connect the exterior control lever 32 to a remote control station, such as the dash board of a vehicle mounting the power take-off.

The holes 65 in the flange 66 on the casing 7 are used for securing the power take-off to the source of power.

What is claimed is:

1. A gear shifting mechanism for shifting the gears on parallel shafts in a casing comprising combined selector and shifter mechanism carried by the casing and operatively associated with the gears to shift the gears alternately on the shafts from neutral to engaged positions, said mechanism including a lever exteriorly of the casing moveable in one direction to shift one gear into engaged position and in the opposite direction to shift another gear into engaged position, a swingable control plate moveable with said lever, a stationary plate in said casing, a shifter member interposed between said control plate and said stationary plate and having oppositely extending shift arms connected to said gears, shiftable fulcrum means between said control plate and each of said shift arms operable in one position to lock one shift arm to said stationary plate, means between said control plate and said shifter member for swinging the latter around the fulcrum means locked to the stationary plate to shift the selected gear into engaged position, and means to lock the other gear in its neutral position.

2. A gear shifting mechanism for shifting the gears on parallel shafts in a casing comprising combined selector and shifter mechanism carried by the casing and operatively associated with the gears to shift the gears alternately on the shafts from neutral to engaged positions, said mechanism including a lever exteriorly of the casing moveable in one direction to shift one gear into engaged position and in the opposite direction to shift the other gear into engaged position, a swingable control plate moveable with said lever, a stationary plate in said casing, a shifter member interposed between said control plate and said stationary plate and having oppositely extending shift arms, shiftable fulcrum means between said control plate and each of said shift arms operable in one position to lock one shift arm to said stationary plate, means between said control plate and said shifter member for swinging the other shift arm to shift the selected gear into engaged position without shifting the other gear.

3. A gear shifting mechanism for shifting a pair of gears on parallel shafts journalled in a casing comprising combined selector and shifter mechanism carried by the casing and operatively associated with the gears to shift the gears alternately on the shafts from neutral to engaged positions, said mechanism including a lever exteriorly of the casing moveable in one direction to shift one gear into engaged position and in the opposite direction to shift the other gear into engaged position, a swingable control plate moveable with said lever, a shifter member interposed between said control plate and the casing and having oppositely extending shift arms, shiftable fulcrum means between said control plate and each of said shift arms operable in one position to lock one shift arm with respect to said casing, means between said control plate and said shifter member for swinging the other shift arm to shift the selected gear into engaged position, and means to lock the other gear in its neutral position.

References Cited in the file of this patent

UNITED STATES PATENTS

| | | |
|---|---|---|
| 2,197,938 | Lapsley et al. | Apr. 23, 1940 |
| 2,548,182 | Wagner | Apr. 10, 1951 |
| 2,636,390 | Wagner | Apr. 28, 1953 |